United States Patent [19]

Nishiura

[11] Patent Number: 5,526,115
[45] Date of Patent: Jun. 11, 1996

[54] LIGHT SOURCE-DETECTION FIBER-OPTIC GYROSCOPE USING DEPOLARIZED BEAM PROPAGATION

[75] Inventor: Yozo Nishiura, Osaka, Japan

[73] Assignee: Sumitomo Electric Industries, Ltd., Osaka, Japan

[21] Appl. No.: 348,089

[22] Filed: Nov. 25, 1994

[30] Foreign Application Priority Data

Nov. 26, 1993 [JP] Japan .................................. 5-321170

[51] Int. Cl.$^6$ ................................................. G01C 19/72
[52] U.S. Cl. ........................................................ 356/350
[58] Field of Search ............................................ 356/350

[56] References Cited

U.S. PATENT DOCUMENTS

| | | |
|---|---|---|
| 4,848,910 | 7/1989 | Dupraz . |
| 5,245,407 | 9/1993 | Nishiura et al. ............ 356/350 |
| 5,444,533 | 8/1995 | Nishiura et al. ............ 356/350 |

FOREIGN PATENT DOCUMENTS

| | | |
|---|---|---|
| 0522843 | 1/1993 | European Pat. Off. . |
| 0586242 | 3/1994 | European Pat. Off. . |
| 2128533 | 10/1972 | France . |
| 3742201 | 6/1989 | Germany . |
| 6129859 | 9/1992 | Japan . |
| 2089976 | 6/1982 | United Kingdom . |
| 2179140 | 2/1987 | United Kingdom . |

*Primary Examiner*—Samuel A. Turner
*Attorney, Agent, or Firm*—Cushman Darby & Cushman

[57] ABSTRACT

A source-sensitive gyroscope guides light beams emitted from a light emitting device into both ends of the fiber coil, makes the beams propagate in the coil clockwise and counterclockwise, and retrieves the beams into the light emitting device itself. The phase difference is obtained from the change of the driving current or the change of the driving voltage of the light emitting device, or from the change of a photocurrent of the monitoring photodetector mounted behind the light emitting device in the light source. A birefringent medium having an optical path difference longer than the coherent length of the light is interposed between the light emitting device and the end of the fiber. When the light beams are non-polarized, the birefringent medium is aligned in the orientation in which the anisotropic axis is perpendicular to the beam line. When the light beams are linearly polarized, the birefringent medium is arranged in the orientation in which the anisotropic axis inclines at 45 degrees to the linear polarization. When a polarizer is equipped in the beam line, the birefringent medium is arranged in the orientation in which the anisotropic axis inclines at 45 degrees to the linear polarization. In any case, the single birefringent medium plays the role of a substantial depolarizer.

8 Claims, 3 Drawing Sheets c···anisotropic axis a,b···isotropic axis

LIGHT SOURCE-DETECTION FIBER-OPTIC GYROSCOPE USING DEPOLARIZED BEAM PROPAGATION

FIELD OF THE INVENTION

This application claims the priority of Japanese Patent Application No. 321170/1993 filed Nov. 26, 1993.

This invention relates to an improvement of a fiber-optic gyroscope acquiring a signal from a light source, which will be referred to herein as a source-sensitive gyroscope. The source-sensitive gyroscope is a new gyroscope which dispenses with a main photodiode positioned at an end of the fiber path and obtains a phase shift signal from either the change of the performance of emission of a light emitting device or the output of a monitoring photodiode in the light source instead of the main photodiode.

BACKGROUND OF THE INVENTION

A conventional fiber-optic gyroscope usually comprises a light source, a first coupler, a polarizer, a second coupler, a fiber coil, and a photodetector. The light source includes a light emitting device and a monitoring photodetector. The prior gyroscope guides light beams emitted from the light emitting device into an optical fiber. The beams pass the first coupler, are polarized into linear polarization by the polarizer, and are divided into halves by the second coupler. The divided light beams enter both ends of the fiber coil and propagate clockwise (CW) and counterclockwise (CCW) in the fiber coil. Then the beams are integrated by the second coupler, are polarized again and are led to the photodetector which is furnished at an end of the fiber path. The CCW beam and CW beam interfere with each other at the photodetector. The power of the interfering beams is sensed by the final photodetector. The photodetector is positioned at a symmetric spot to the light emitting device with regard to the first coupler. The light source module has a light emitting device and a monitoring photodiode mounted behind the light emitting device. The monitoring photodiode aims at detecting the light power of the light emitting device for stabilizing the light power. A gyroscope has two photodetectors in general., i.e. a main one for detecting the object signal of the interference beams and an auxiliary one for stabilizing the light power of the light emitting device. To distinguish two photodetectors, the main one is now called a main photodetector or a main photodiode, and the auxiliary one is called a monitoring photodetector or a monitoring photodiode.

The reason why two couplers are inserted in the optical path is to equalize exactly the path of the CW beam to the path of the CCW beam. One coupler is still enough to divide light beams into halves, lead the beams to both ends of the fiber coil, integrate the beams, and send the beams to the main photodetector. However, in this case, the paths of the CW beam and the CCW beam are different. The difference of the optical paths brings about an offset between the CW beam and the CCW beam. Thus two couplers are indispensable to avoid the occurrence of the offset.

The purpose of interpositioning the polarizer in the optical fiber path is equalizing the polarizations of the CCW beam and the CW beam. Two beams with different polarizations cannot interfere with each other at all. Interference demands the same polarization of two beams. A gyroscope having a light emitting device, a main photodetector, a fiber coil, two couplers and a polarizer has been called a "minimum configuration", since these elements have been deemed indispensable. The requirement that a gyroscope must have a photodetector belonged to common knowledge.

However the Inventors of the present invention have objected to the common sense. The Inventors have proposed a gyroscope acquiring a signal from the light source instead of the final main photodetector by Japanese Patent Application No.5-57756. FIG. 2 shows the basic structure of the gyroscope suggested first by the Inventors.

A light source (1) has a light emitting device (8) and a monitoring photodiode (9). The light emitting device (8) emits monochromatic light or quasi-monochromatic light. The light beams are converged by a lens (10) onto an end of a single-mode optical fiber (2). The light beams pass a polarizer (3) and are converted into linearly polarized beams. Further the light beams are divided into halves by a coupler (4). These divided two beams are guided into ends of a fiber coil (5) which is produced by winding a single-mode fiber a plurality of turns around a bobbin. The beams propagate in the coil (5) clockwise and counterclockwise. A phase-modulator (6) is interposed at an end of the fiber coil for modulating the phase of light passing therethrough. A depolarizer (7) depolarizes the light beams passing there through. The proposed gyroscope has only a single coupler. The gyroscope has no photodetector which is used to be furnished at an end of the fiber path symmetric to the light source with regard to the coupler. Thus the new gyroscope succeeded in omitting a photodetector and a coupler.

Being emanated from the light source, the beams are divided in half by the coupler, propagate in the coil (5) counterclockwise and clockwise and return to the light source (1). The light source (1) includes a light emitting device (8) and a monitoring photodiode (9). Here the light source (1) includes an assembly of the light emitting device (8) and the photodetector (9) for monitoring the power of the light emitting device. The returning light perturbs the oscillation of a laser diode or superluminescent diode. The emission performance of the laser or superluminescent diode is greatly changed by the returning light. Then the power of the interfering light is detected from the change of the driving current of the light emitting device (laser diode or superluminescent diode) at a constant applied voltage, or the change of the applied voltage of the light emitting device at a constant current. Otherwise the power of the interfering beams can be detected from the photocurrent of the monitoring photodiode (9). Then there are three difference ways (voltage, current or photocurrent) for detecting the signal including Sagnac's phase shift. Synchronous detection of the signal (voltage, current or photocurrent) with a carrier of the same frequency as the phase modulation reveals the Sagnac phase shift.

The newly proposed source-sensitive gyroscope enjoys an advantage of being built with still fewer parts than the minimum configuration. A coupler and a photodetector have been removed in the new gyroscope. Saving of a coupler considerably reduces the cost of production, because it is rather difficult to manufacture a coupler. Omission of a photodetector can further reduces the cost of parts.

The fiber coil can be built either with a single-mode fiber (SM-fiber) or with a polarization maintaining fiber (PM-fiber) in the source-sensitive gyroscope.

The gyroscope with a coil of a polarization maintaining fiber has a benefit of maintaining the polarization of the light propagating in the coil. Further the gyroscope can do without a depolarizer, since the light beams spread in the coil with the same polarization. Nevertheless, the PM fiber is still an expensive fiber due to the difficulty of production. Adoption of the polarization maintaining fiber enhances the cost of production of the gyroscope.

The gyroscope with a coil built by a single-mode fiber enjoys the advantage of low cost of production. The single-mode fiber gyroscope, however requires further contrivance. A single-mode fiber is unable to keep the polarization of light in a certain direction due to the rotational symmetry. Accidental rotation of polarization induces the fluctuation of the scale factor and the drift of the zero-point. Thus the single-mode fiber gyroscope needs to depolarize the light beams by interposing a depolarizer (7) to avoid the fluctuation of the scale factor or the zero-point. The ground of the necessity of depolarization is now clarified briefly.

A single-mode fiber is incapable of maintaining the polarization due to the perfect rotational symmetry around the axis. In the gyroscope, the light enters the fiber coil (5) after the light has been converted into linear polarization in a certain direction by the polarizer. The polarization of the light is likely to rotate in the single-mode fiber coil by some reasons, for the single-mode fiber has no function of keeping the polarization in a constant direction. When the light beams enter the polarizer in the reverse direction, the beams are not always able to pass the polarizer. If the polarization were rotated at 90 degrees in the coil, the light could not pass the polarizer at all. Therefore a depolarizer is interposed in the fiber path for depolarizing the light beams before returning to the polarizer. The depolarizer enables half of the light beams to pass the polarizer in any case. The interposition of a depolarizer reduces the fluctuation of the scale factor.

The depolarizer has another role. There is an optical path difference between two beams with perpendicular polarizations due to the anisotropic fluctuation of refractive index, although two beams travel in the same single-mode fiber in the same direction. The optical path difference would induce the drift of the zero-point. To suppress the occurrence of the optical path difference between two beams with orthogonal polarizations, the polarizer with a transparent axis is interposed in the fiber path for restricting the polarization in the transparent axis direction. Extinction rate is a parameter representing the power of a polarizer to convert light beams into linear polarization beams. The extinction rate is defined as a quotient of the light power of the polarization vertical to the transparent axis divided by the light power of the polarization parallel with the transparent axis of the polarizer. A polarizer of an extinction ratio of 0 is a perfect polarizer. Extinction ratio has any value between 0 and 1. However a practical polarizer has a definite extinction ratio. Thus an actual polarizer cannot entirely suppress the transit of the light of the polarization vertical to the transparent axis.

The necessary extinction ratio of a polarizer depends upon the state of the polarization of incident beams. If incident beams have various polarizations with high coherency, the incident beams demand an extremely small extinction ratio for a polarizer. However it is hard to fabricate a polarizer with such a small extinction ratio. On the contrary, a depolarizer endeavors to forbid two light beams with orthogonal polarizations from interfering with each other by giving the two beams an optical path difference longer than the coherent length of the light. The depolarizer alleviates the load of the polarizer by suppressing the interference between the two beams with various polarizations. Namely, the depolarizer has the complementary role of suppressing the drift of the zero-point as well as the polarizer has been interposed for suppressing the drift.

Lyot's depolarizer is a well known depolarizer which is produced by gluing two birefringent bulk crystals with the principal (anisotropic) axes inclining at 45 degrees. Instead of Lyot's bulk crystals, a fiber-type depolarizer can be fabricated from two birefringent fibers. FIG. 3 shows a fiber-type depolarizer made by splicing two birefringent fibers (polarization maintaining fiber) with the anisotropic axes twisted to each other at 45 degrees. Since the birefringent principal axes incline reciprocally at 45 degrees, the spliced two anisotropic fibers become a depolarizer.

Now a depolarizer is further explained prior to clarifying the problems of prior art. There is a birefringent material which has a length L, an extraordinary refractive index $n_e$ and an ordinary refractive index $n_o$. The material yields an optical path difference $\Delta L$ between an extraordinary beam and an ordinary beam. Then the lengths of the fibers must be determined so as to maintain the path length longer than the coherent length of the light.

$$\Delta L=|(n_e-n_o)L|>Lc \qquad (1)$$

Two light wave packets which are distanced by a length longer than the coherent length do not interfere with each other. Therefore the extraordinary beam and the ordinary beam, which have passed the birefringent material satisfying Inequality (1), don't interfere with each other, because two packets will be distanced farther than the coherent length after the transit of the birefringent material. A depolarizer is composed of two birefringent materials satisfying this condition.

In many cases, the ratio of the length is determined to be 1:2. An end of a second birefringent element is glued to an end of a first birefringent element in a posture wherein the anisotropic axis (principal axis) of the second birefringent element is inclined at 45 degrees to the anisotropic axis (principal axis) at the connected ends. When a light beam travels in the first birefringent object, the beam is divided in an arbitrary ratio to an extraordinary beam with a polarization parallel to the anisotropic axis and an ordinary beam with a polarization perpendicular to the anisotropic axis. When the beams pass the interface of two birefringent media, the extraordinary beam and the ordinary beam are respectively divided into precise halves in power. Each of the two wave packets is again divided into an ordinary beam and an extraordinary beam and propagates in the second birefringent medium. Therefore when four wave packets go out of the end of the second medium, the extraordinary beams with the polarization parallel with the anisotropic axis have exactly the same power as the ordinary beams with the polarization vertical to the anisotropic axis. Thus any beam with an arbitrary polarization has the same power, since any polarization can be composed by a linear combination of the ordinary beam and the extraordinary beam with coefficients whose square sum is always equal to 1.

Four different optical paths are generated by the birefringency of two media. An assembly of light waves emitted from a light source at the same time is called a wave packet. The first medium produces two wave packets by its birefringency. The second medium multiplies the wave packet by 2. Thus four wave packets run with separations after the end of the second medium. If the ratio of the two media is set to be 1:2, three distances between any neighboring wave packets are all the same. The common distance is longer than the coherent length Lc. Thus four wave packets no longer interfere with each other. Since any beam with an arbitrary polarization has the same power and any two wave packets of beams do not interfere with each other, the state can safely be called "depolarized". Of course, the non-polarization state is not perfect as a non-polarization state of an incandescent lamp. Nevertheless, the state the depolarizer prepares is quite similar to the perfect non-polarization state. Thus a depolarizer can be built by gluing two birefringent media satisfying Inequality (1) with the anisotropic axes which are twisted with each other at 45 degrees.

PROBLEMS TO BE SOLVED

It is difficult to melt and couple ends of two fibers in the state wherein their the principal axes twist at 45 degrees. The coupling requires a special splicing machine with high precision. Deviation of the twisting angle from 45 degrees should be rigorously forbidden. Splicing of birefringent fibers under the restriction of the 45 degree inclination requires far more rigorous controlling of the conditions than splicing of ordinary single-mode fibers. Difficulty of splicing raises the cost of production of a fiber-type depolarizer. Furthermore, the polarization maintaining fiber itself Is still more expensive than the ordinary single-mode fiber. Therefore, the depolarizer constructed by gluing two birefringent fibers enhances the cost of a gyroscope based on the depolarizer.

The source-sensitive gyroscope is an entirely new gyroscope originated from an idea of Inventors. Nevertheless, even the source-sensitive gyroscope was still expensive due to the depolarizer. The existence of the fiber-type depolarizer lowers the productivity and hinders reduction of the cost of manufacture.

A purpose of this invention is to provide a lower-priced source-sensitive gyroscope than the one of FIG. 2. Another purpose of the invention is to provide a source-sensitive gyroscope which is endowed with high productivity. Thus, this invention aims at dispensing with the depolarizer to further reduce the cost of producing a source-sensitive gyroscope.

SUMMARY OF THE INVENTION

A fiber-optic gyroscope of this invention interposes a birefringent medium between a light source and an end of a fiber instead of interposing a depolarizer in a fiber path. The interposed birefringent medium plays the role equivalent to a depolarizer in the gyroscope of this invention despite comprising a single birefringent material. The substantial depolarizer of this invention does not require two birefringent materials nor difficult splicing of two medium. This invention requires only a single birefringent material as a substantial depolarizer. Rutile crystal, calcite crystal, polarization maintaining fiber, etc. can be employed as a birefringent medium of the present invention. This invention selects one among three different configurations depending on the polarization state of the beams and on the existence or non-existence of a polarizer.

Configuration ①: When the light source emits non-polarized beams, the birefringent medium should be positioned in the state in which the anisotropic axis is perpendicular to the beam line.

Configuration ②: When the light source emits linearly polarized beams, the birefringent medium shall be aligned in the state in which the anisotropic axis inclines to the linear polarization at 45 degrees.

Configuration ③: When a polarizer is also interposed between a light source and an end of a fiber, the birefringent medium should be inserted between the polarizer and the fiber end. Furthermore the principal axis must incline at 45 degrees to the transparent axis of the polarizer.

FIG. 1 shows a basic structure of the fiber-optic gyroscope of this invention. The gyroscope comprises a light source (1), a lens (10), a birefringent medium (11), a fiber coupler (4) with four ends, a fiber coil (5) and a phase modulator (6). The birefringent medium (11) is interposed between the lens (10) and an end of the optical fiber (2). The light source (1) has a light emitting device (8) and a monitoring photodiode (9). The light emitting device (8) emits monochromatic or quasi-monochromatic light beams with a definite coherent length in both directions. The monitoring photodiode (9) detects the power of the backward beams. The fiber coil (5) has produced by winding a single mode fiber in a coil of a plurality of turns.

The forward beams are converged by the lens (10), pass the birefringent medium (11) and enter an end of the fiber (2). The light beams are divided into halves by the coupler (4) with four ends. Two ends of the coupler (4) are connected to the ends of the fiber coil (5). The divided beams travel clockwise and counterclockwise in the fiber coil (5). The clockwise, beams and counterclockwise beams are unified by the coupler (4), pass the birefringent medium (11) in the reverse direction. Then the unified beams return into the light emitting device (8) in the light source (1). The light emitting device (8), e.g. a superluminescent diode or a laser diode, is highly sensitive to the returning light. The returning light beams perturb the emission of the light emitting device (8). The power of the light emitting device (8) is deeply influenced by the returning beams. The variations of the emission performance appear at three different observable variables. One variable is the photocurrent of the monitoring photodiode which has been installed behind the light emitting device, when the driving current of the light emitting device is kept at a constant value. Another variable is the driving current of the light emitting device, when the driving voltage is kept to be constant. Further the other variable is the driving voltage of the light emitting device, when the driving current is kept to be constant.

The returning light beams themselves are a signal including a phase difference between the CW beams and the CCW beams which is in proportion to an angular velocity of the fiber coil. Then the angular velocity or the phase difference is obtained by the synchronous detection of the change of a current, the change of a voltage of the light emitting device or the change of a photocurrent of the monitoring photodiode. This structure corresponds to configuration ① and configuration ②.

FIG. 4 shows another example of the present invention. The example has a polarizer (20) and a birefringent medium (11) between the light source (1) and the fiber end. The anisotropic axis of the birefringent medium inclines at 45 degrees to the transparency axis of the polarizer (20). This example corresponds to configuration ③.

The birefringent medium plays a unique role in this invention. The function of the birefringent material is now clarified. FIG. 5 designates a birefringent medium in a three-dimensional coordinate system. Birefringent crystals are sorted into biaxial anisotropy and uniaxial anisotropy. This invention can be realized by both of uniaxial ones and biaxial ones. A biaxial anisotropic crystal has no problem regarding the orientation of the crystal for making a substantial depolarizer, because three orthogonal axes are all distinguishable due to the three-dimensional anisotropy.

By contrast, a uniaxial anisotropic birefringent crystal requires an explanation of the orientation for acting as a substantial depolarizer, because a uniaxial anisotropy has two equivalent isotropic axes and an anisotropic axis which are all orthogonal to each other. A uniaxial crystal has three orthogonal optical principal axes which are identical to the crystallographical axes. Three axes are designated as a-axis, b-axis and c-axis. In general, the a-axis and the b-axis are equivalent, isotropic axes. The anisotropic axes is the c-axis. A plane including the a-axis and the b-axis is called ab-plane. Another plane including the b-axis and the c-axis is defined as bc-plane. The ac-plane includes the a-axis and the c-axis.

There may be various orientations or configurations of a birefringent crystal to the beam line for various purposes. If the crystal should give only a path difference to an extraordinary ray and an ordinary ray without endowing spatial separation in the direction vertical to the beam line, the ac-plane of the crystal should be vertical to the beam line. Namely the beam line is parallel with the b-axis in this case. Then Z-direction of the three-dimensional coordinate is defined to be parallel with b-axis of the crystal.

In the case of a biaxial crystal, any axis (a-axis, b-axis or c-axis) can be selected as the Z-direction, i.e. the beam line. A linear polarized beam polarized in the X-direction is called an X-polarization beam, or an X-polarization for short. A linear polarization in Y-direction is also called a Y-polarization. When an X-polarization beam and a Y-polarization beam enter the biaxial crystal in Z-direction, the birefringency gives a difference of the phase velocities between the X-polarization and the Y-polarization. Thus, when the beams pass the birefringent crystal, the beams have an optical path difference ΔL in proportion to the difference of the refractive index. "$n_x$" denotes the refractive index of X-polarization. "$n_x$" denotes the refractive index of Y-polarization. Then the optical path difference ΔL is given by $$\Delta L = |n_x - n_y| L \quad (2)$$

The path difference should be longer than the coherent length Lc of the light source. Namely $$\Delta L > Lc \quad (3)$$

Then an X-polarization beam and a Y-polarization beam do not interfere with each other. After all, a depolarizer is a device for equalizing the power of X-polarization beams to the power of Y-polarization beams substantially.

A conventional depolarizer, e.g. a Lyot's depolarizer, required two birefringent crystals whose anisotropic axes twist at 45 degrees without exception. The first birefringent crystal produced ordinary rays and extraordinary rays from the incident beams with arbitrary polarizations. The second birefringent crystal equalized the power of X-polarization beams with the power of Y-polarization beams by the inclination of the axes at the interface there between at 45 degrees.

If other medium can equalize the powers of X-polarization beams with Y-polarization beams, a new depolarizer can be built with the medium and only a single birefringent medium instead of two birefringent materials.

In general, a fiber-optic gyroscope adopts a light emitting device with low coherency which emits light of a short coherent length, for example, a superluminescent diode.

A superluminescent diode emits light beams in an intermediate condition between the spontaneous (natural) emission of a light emitting diode and the stimulated emission of a laser diode. Thus the emission of a superluminescent diode is a mixture of the natural emission and the stimulated emission. The power of the driving current changes the ratio between the natural emission and the stimulated emission. When the light power is low, i.e. the driving current is small, the natural emission prevails. When the light power is high, i.e. the driving current is large, the stimulated emission surpasses the natural one. The emission condition determines which configuration of ①, ② or ③ the gyroscope shall employ.

① When the light emitting device emits light beams by the natural emission mode, the beams are non-polarized from the beginning. When a low driving power is supplied to a superluminescent diode, the superluminescent diode emanates nearly perfect depolarized beams. In this case, the anisotropic axis (c-axis) of the birefringent medium can adopt any orientation in the plane (XY-plane) perpendicular to the beam line (Z-direction, b-axis). FIG. 5 shows a configuration pertinent to the case. The original beams are further depolarized by separating X-polarization beams (c-axis) from Y-polarization beams (a-axis) by a distance longer than the coherent length by the birefringency perpendicular to the beam line. Here, X-polarization beams are beams having the polarization in c-axis (anisotropic axis). Y-polarization beams are beams having the polarization in a-axis (isotropic axis). The single birefringent medium plays the role of a depolarizer in this case.

② When the light emitting device emits beams mainly by stimulated emission, the beams are linearly polarized in a certain direction determined by the geometrical anisotropy of the device. In this case, the anisotropic axis (c-axis) of the birefringent medium should be oriented to incline at 45 degrees in the plane vertical to the linear polarization of the beams emitted from the light emitting device. Namely, the beam line (Z-direction) is parallel with b-axis and the linear polarization is parallel with a bisection line between a-axis and c-axis. The birefringent medium divides the power of the beams exactly in half into X-polarization beams and Y-polarization beams due to the 45 degree inclination. These beams (wave packets) are distanced from each other more than the coherent length by the birefringent medium. Thus two groups of the beams do not interfere with each other, even if the polarization would rotate for some reason. The power of the beams with arbitrary polarization directions is entirely the same. Thus the beams are non-polarization beams. The single birefringent medium acts as a depolarizer in this case, too.

③ The gyroscope of this invention can do without a polarizer. However, if one wants to enhance the selectivity of polarization further, a polarizer (20) should be interposed between the light source (1) and the birefringent medium (11), as demonstrated by FIG. 4. In this case, the anisotropic axis (c-axis) of the birefringent material shall incline at 45 degrees to the transparency axis of the polarizer (20). In the configuration, Z-direction (b-axis) is the beam line. X-direction is parallel with c-axis. Y-direction is parallel with a-axis. The beams passing the polarizer have the linear polarization parallel with a bisection between X-direction and Y-direction. The posture of the birefringent material divides the power exactly in half into X-polarization beams and Y-polarization beams, similarly to ②. The X-polarized beams are distanced from the Y-polarized beams farther than the coherent length of the light emitting device. Therefore, the beams with different polarizations will not interfere with each other, even if the polarization rotates for some reason. The power of the beams with arbitrary polarizations is exactly the same. The beams are non-polarized. The birefringent medium acts as a depolarizer. In this configuration, the polarizer can be replaced by a birefringent material which is positioned at a special orientation.

All cases ①, ② and ③ utilize a birefringent medium as a substantial depolarizer. ① separates originally non-polarized beams farther than the original distance so as to suppress the interference more completely. ② and ③ exploit the linear polarization of the beams for depolarizing them by equalizing the powers of two beams of perpendicular polarizations.

The advantages of this invention is now clarified. The Inventors suggested a simplified gyroscope by Japanese Patent Application No. 5,57756, which still required a depolarizer. In general, the depolarizer of the prior art was constructed by gluing two birefringent materials with anisotropic axes inclining at 45 degrees. A fiber-type depolarizer necessitates a difficult operation of splicing two polarization maintaining fibers with anisotropic axes at 45 degrees. On the contrary, this invention enables to a substantial depolarizer to be constructed with only a single birefringent medium. This invention can do without the difficult and complicated assembly of splicing two expensive polarization maintaining fibers rigorously at 45 degree inclination. This invention succeeds in reducing both the cost of material and the cost of production of manufacturing a gyroscope.

DETAILED DESCRIPTION OF THE EMBODIMENTS

Figure 1:
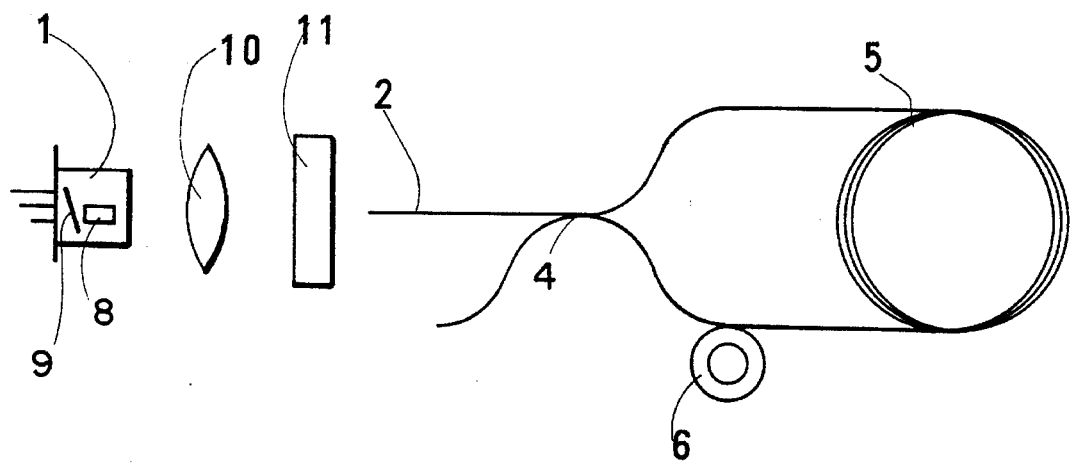
FIG. 1 is a schematic view of a source-sensitive fiber-optic gyroscope of this invention.
Figure 2:
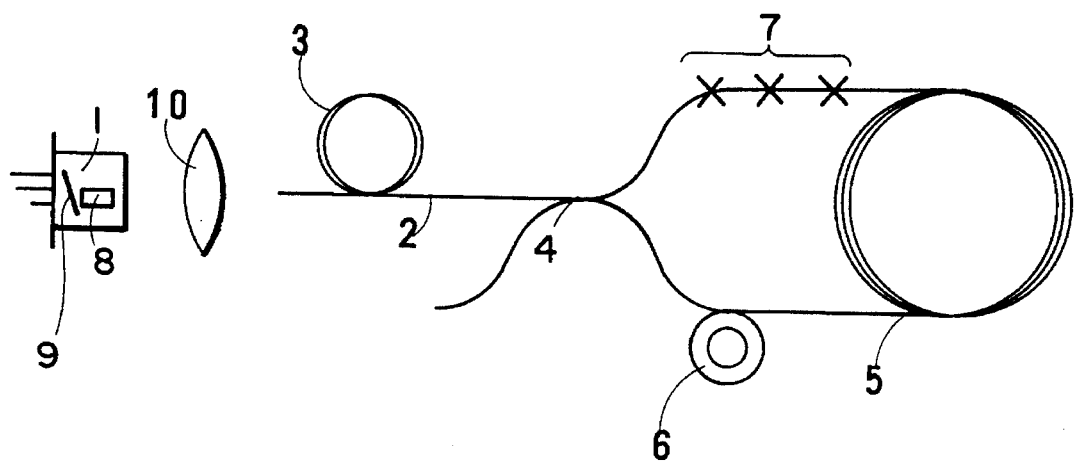
FIG. 2 is a schematic view of a source-sensitive fiber-optic gyroscope of Japanese Patent Application No.5-57756 (Japanese Patent Laying Open No. 6-129859) originally suggested by the Inventors.
Figure 3:
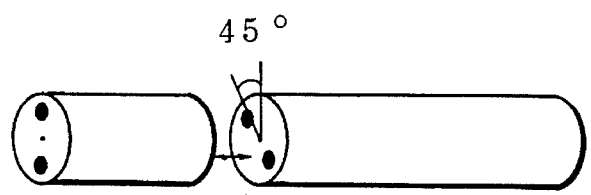
FIG. 3 is a dissected view of a fiber-type depolarizer fabricated by splicing two polarization maintaining fibers with anisotropic axes inclining to each other at 45 degrees.

An embodiment employs a bulk optical crystal as the birefringent medium (11) in FIG. 1. For example, the birefringent medium (11) can be built with a rutile crystal, a calcite crystal, a quartz, or other birefringent crystal. This embodiment adopts calcite as the birefringent medium. Calcite has an ordinary beam refractive index $n_o$=1.66 and an extraordinary index $n_e$=1.49. Since the refractive indices have a difference 0.17, the optical path difference $\Delta L$ between an ordinary beam and an extraordinary beam is given by $$\Delta L = BL = 0.17 L \qquad (4)$$

The embodiment employs a superluminescent diode as a light emitting device. The superluminescent diode has a coherent length Lc of 50 μm which is a typical value for superluminescent diodes. The path length L which gives an optical path difference longer than the coherent length must satisfy the inequality;

$$0.17 L > 50 \ \mu m \qquad (5)$$

Then the calcite must have a length L $$L > 294 \ \mu m \qquad (6)$$

This result reveals that a thin (or short) calcite crystal is sufficient to construct a birefringent medium in order to give an ordinary beam and an extraordinary beam an optical path difference longer than the coherent length. If the light emitting device has a longer coherent length, the thickness of the crystal must be increased. The necessary thickness of the calcite crystal is easily calculated from the inequality (1).

Otherwise, the birefringent medium (11) is fabricated with polarization maintaining fibers. If the birefringency B is known, the necessary length of the polarization maintaining fibers can be reckoned. $B=5\times10^{-4}$ is a typical birefringency of polarization maintaining fibers. For the typical value, Inequality (1) is reduced to $$0.0005 L > 50 \ \mu m \qquad (7)$$

Namely $$L > 100 \ mm \qquad (8)$$

This result means that about 0.1 m of the polarization maintaining fiber can construct a depolarizer according to the idea of this invention. Such a short fiber would not enhance the cost of gyroscope so much. A conventional depolarizer would require still another polarization maintaining fiber which is twice as long as the mentioned 0.1 m long fiber. The fabrication of the conventional depolarizer further demands the difficult process for splicing two polarization maintaining fibers with the principal axes twisting at 45 degrees. This invention can do without the second fiber and the difficult splicing of two birefringent fibers.

Figure 4:
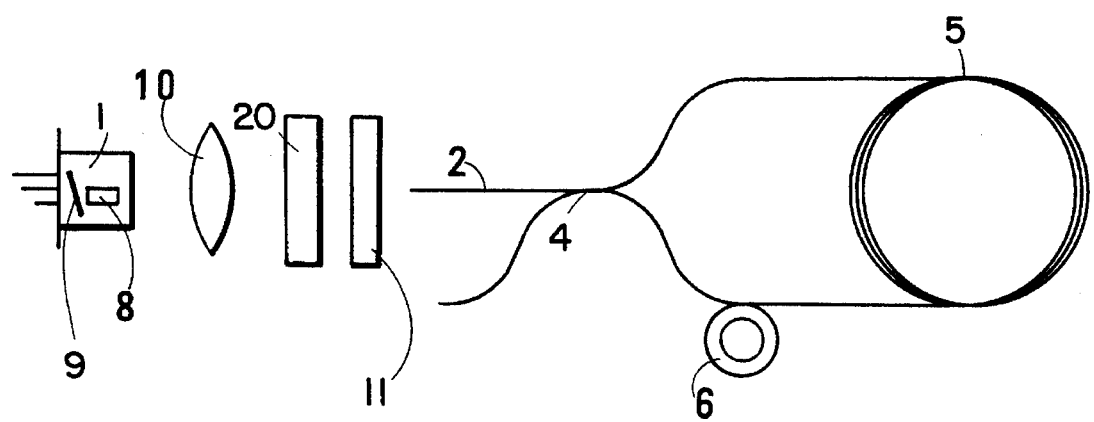
FIG. 4 is a schematic view of another source-sensitive fiber-optic gyroscope of this invention.
Figure 5:
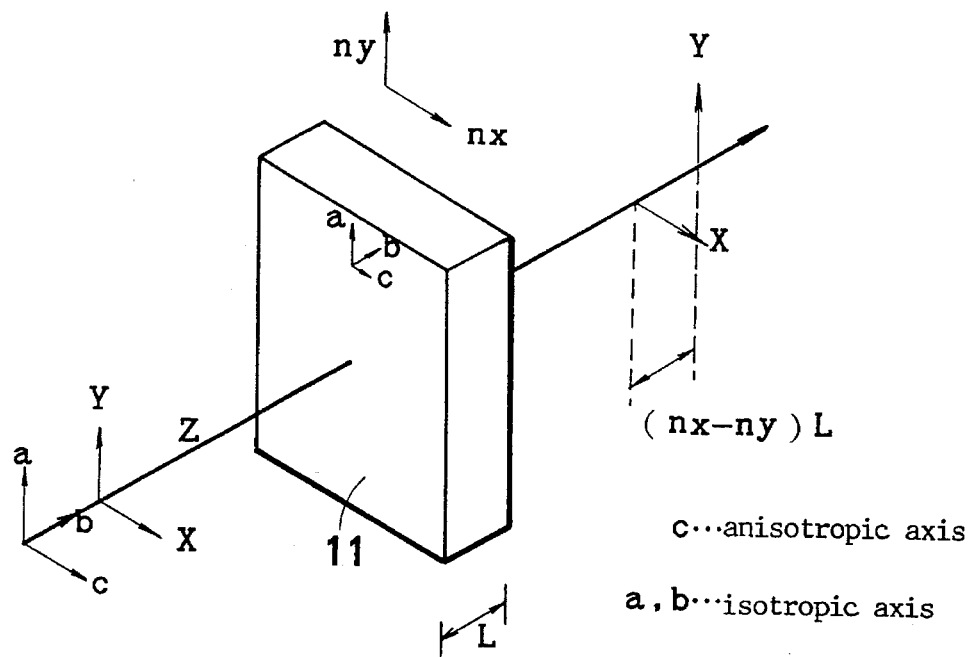
FIG. 5 is a perspective view of a birefringent medium for clarifying the function the the birefringent medium.

When a polarizer (20) is interposed between the fiber (2) and the light source (1) before or behind the birefringent medium (11) as demonstrated in FIG. 4 (configuration ③), the anisotropic axis of the birefringent medium (11) should incline at 45 degrees to the transparency axis of the polarizer (20) in the plane vertical to the beam line. In this case, the polarizer (20) can be constructed, for example, by a polarization prism, a metal-dielectric multilayer polarizer or a fiber-type polarizer.

Figure 6:
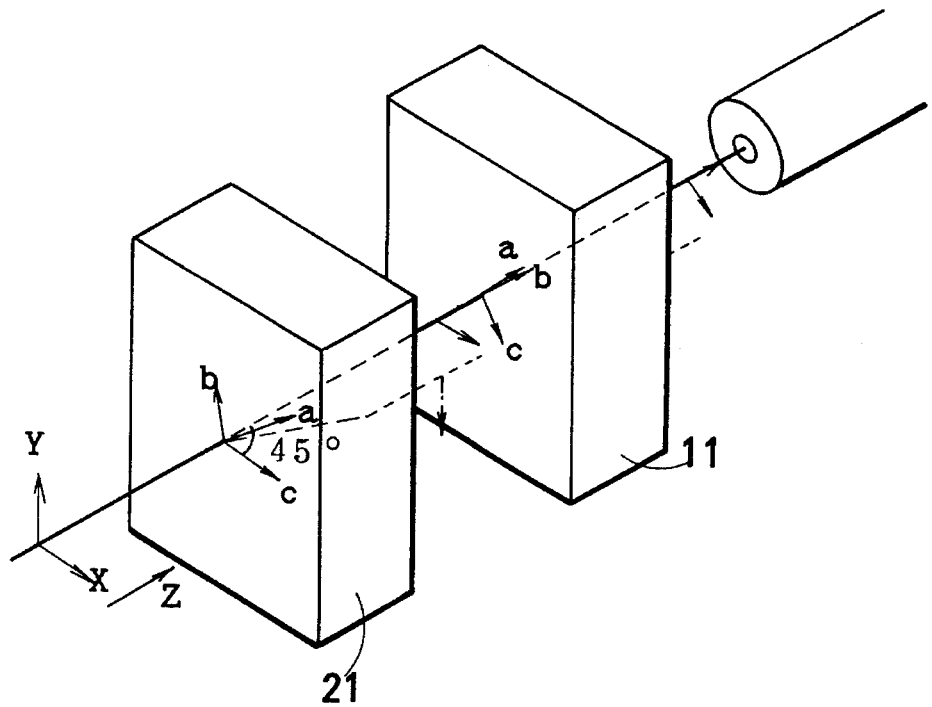
FIG. 6 is a perspective view of two birefringent media, one of which plays the role of the polarizer.

Otherwise, another birefringent medium (21) can be further adopted as a substantial polarizer, as shown in FIG. 6. In this case, the birefringent medium (21) should be disposed in the orientation in which the anisotropic axis (c-axis) is inclined at 45 degrees to the beam line. In FIG.6, the latter birefringent medium (11) plays the role of the depolarizer according to this invention. The latter birefringent medium (11) is aligned with the b-axis (isotropic axis) in parallel with the beam line (Z-direction: b∥Z). The a-axis and the c-axis (anisotropic axis) are included in XY-plane. In the coordinate, anisotropic c-axis can be determined in parallel with X-direction (X∥c), Y-direction (Y∥c) or otherwise (c∥XY-plane).

However the former birefringent medium (21) spatially separates an ordinary beam from an extraordinary beam. In the example, the ordinary beam which is defined as a beam having no component of polarization in the c-axis (anisotropic axis) passes straight through the former medium (21), as shown by a solid line. On the contrary, the extraordinary beam which is defined as a beam having some component of polarization in c-axis bends at the incident surface, passes through the crystal along a slanting path and goes out at a point different from the point of the entrance of the ordinary ray. The extraordinary beam is separated spatially from the ordinary beam. Both beams are linearly polarized beams.

The spatial separation occurs, in particular, most conspicuously in the configuration in which the anisotropic axis is inclined at an angel θ between 20 degrees and 70 degrees to the beam line (Z-direction). The most preferable angle θ is 45 degrees. The orientations of isotropic axes are arbitrary. In the case of the vertical incidence and θ=45 degrees, the inclination angle Θ of the extraordinary ray at the incident plane is a quotient of a difference of the refractive indices divided by an average thereof. Hence, $\Theta = 2(n_e - n_o)/(ne + no)$. If the birefringent medium (21) has a sufficient thickness L, the extraordinary beam once deviated from the beam line cannot enter the core of the optical fiber. Only the ordinary beam enters the core of the fiber. For 45 degree inclination of the anisotropic axis to the beam line, the vertical separation is given by $\Theta L = 2|(n_e - n_o)|L/(n_e + n_o)$. If the separation is longer than the core diameter Df of the fiber i.e., $2|(n_e - n_o)|L/(n_e + n_o) > Df$, either an extraordinary beam or an ordinary beam can enter the core of the fiber. In general, θ denotes the slanting angle of the anisotropic axis to the beam line. The inclination angle Θ between an ordinary beam and an extraordinary beam is $\Theta = (n_e - n_o) L \sin 2\theta / n_k$, where $n_k = n_o \cos^2 \theta + n_e \sin^2 \theta$. The general condition for separation is given by $|(n_e - n_o)| L \sin 2\theta / n_k > Df$.

As explained before, an ordinary beam is defined as a beam having no c-axis component of polarization. Thus an ordinary beam has a linear polarization which is parallel with the difference between an a-axis unit vector and a b-axis unit vector. The direction of the linear polarization is uniquely determined by the orientation of the birefringent crystal. By contrast, an extraordinary beam is defined as a beam having some c-axis component of polarization. The polarization of the extraordinary beam is orthogonal both to the ordinary beam polarization and to the beam line. Therefore, the polarization of the extraordinary beam is also uniquely determined.

The former birefringent medium spatially separates an ordinary beam from an extraordinary beam. In the example, only an ordinary beam enters the core of the fiber. The ordinary beam has a definite linear polarization. Thus the former birefringent medium acts as a substantial polarizer. An alternative introduces only an extraordinary beam in the fiber and expels the ordinary beam. Both cases are equivalent for this invention. These functions of the birefringent material have been described in detail by Japanese Patent Application No. 5-208683 proposed by the Inventors of the present invention.

The latter birefringent medium should be aligned in the same manner which has been explained for the substantial depolarizer consisting of a birefringent material. Namely the b-axis is parallel with Z-direction. The c-axis and the a-axis are perpendicular to Z-direction. Furthermore both c-axis and a-axis incline at 45 degrees to the linear polarization of the beams which go out of the first birefringent medium (21).

What we claim is:

1. A fiber-optic gyroscope obtaining a signal from a light source comprising:

a light source having a light emitting device for emitting monochromatic or quasi-monochromatic, non-polarized light beams with a definite coherent length and a monitoring photodetector mounted behind the light emitting device for monitoring the power of the light emitted from the light emitting device;

a fiber coil with two ends produced by winding a single-mode fiber into a coil of a plurality of turns;

a coupler with four fiber ends for dividing the non-polarized light beams from the light emitting device into halves, for introducing the divided beams into both ends of the fiber coil, and for integrating the beams returning from the fiber coil; and a birefringent medium with more than one anisotropic axis being interposed on a beam line between the light source and the coupler, and having a thickness producing an optical path difference between an ordinary beam and an extraordinary beam longer than the coherent length of the light emitted from the light source;

wherein the non-polarized light beams emitted from the light emitting device are separated into ordinary beams and extraordinary beams in the direction of the beam line by the birefringent medium by a distance longer than the coherent length of the light; both the ordinary beams and the extraordinary beams are allowed to enter a core of the fiber; the beams are divided into halves by the coupler; the non-polarized divided beams propagate in the fiber coil clockwise and counterclockwise, are integrated by the coupler for interfering with each other, and return into the light emitting device; the returning interfering beams perturb the emission of the light emitting device; and a signal including the phase difference between the clockwise propagating beams and the counterclockwise propagating beams is obtained from the change of a driving current or the change of a driving voltage of the light emitting device, or from the change of a photocurrent of the monitoring photodetector.

2. A fiber-optic gyroscope as claimed in claim 1, wherein the light emitting device is a superluminescent diode which emits light beams by spontaneous emission.

3. A fiber-optic gyroscope as claimed in claim 1, wherein the birefringent medium has a uniaxial anisotropy and the anisotropic axis is arranged perpendicular to the beam line.

4. A fiber-optic gyroscope as claimed in claim 3, wherein the birefringent material is a rutile single crystal, a calcite single crystal, or a quartz single crystal.

5. A fiber-optic gyroscope obtaining a signal from a light source comprising:

a light source having a light emitting device for emitting monochromatic or quasi-monochromatic, linearly-polarized light beams with a definite coherent length and a monitoring photodetector mounted behind the light emitting device for monitoring the power of the light emitted from the light emitting device;

a fiber coil with two ends produced by winding a single-mode fiber into a coil of a plurality of turns;

a coupler with four fiber ends for dividing the light beams from the light emitting device into halves, for introducing the divided beams into both ends of the fiber coil, and for integrating the beams returning from the fiber coil; and a birefringent medium with more than one anisotropic axis being interposed on a beam line with the anisotropic axis inclining at 45 degrees to the linear polarization between the light source and the coupler, and having a thickness for producing an optical path difference between an ordinary beam and an extraordinary beam longer than the coherent length of the light emitted from the light source;

wherein the linearly polarized light beams emitted from the light emitting device are separated into ordinary beams and extraordinary beams with the same power in the direction of the beam line by the birefringent medium by a distance longer than the coherent length of the light; both the ordinary beams and the extraordinary beams are allowed to enter a core of the fiber; the beams are divided into halves by the coupler; the divided beams propagate in the fiber coil clockwise and counterclockwise, are integrated by the coupler for interfering with each other, and return into the light emitting device; the returning interfering beams perturb the emission of the light emitting device; and a signal including the phase difference between the clockwise propagating beams and the counterclockwise propagating beams is obtained from the change of a driving current or the change of a driving voltage of the light emitting device, or from the change of a photocurrent of the monitoring photodetector.

6. A fiber-optic gyroscope as claimed in claim 5, wherein the light emitting device is a laser diode or a superluminescent diode which emits linearly polarized light beams mainly by stimulated emission.

7. A fiber-optic gyroscope as claimed in claim 6, wherein the birefringent medium has a uniaxial anisotropy and the anisotropic axis is arranged perpendicular to the beam line and inclining at 45 degrees to the linear polarization.

8. A fiber-optic gyroscope as claimed in claim 7, wherein the birefringent material is a rutile single crystal, a calcite single crystal, or a quartz single crystal.

* * * * *